United States Patent
Yanke et al.

(10) Patent No.: US 9,078,396 B2
(45) Date of Patent: Jul. 14, 2015

(54) DRAPER BELT PLATFORM WITH ADDITIONAL CONVEYOR IN TRANSITION AREA

(71) Applicant: Deere & Company, Moline, IL (US)

(72) Inventors: Bryan R Yanke, Eldridge, IA (US); Kris Loff, East Moline, IL (US); Daniel S Hoffman, East Moline, IL (US); Matthew R White, Geneseo, IL (US); Benjamin M Lovett, Colona, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 13/780,429

(22) Filed: Feb. 28, 2013

(65) Prior Publication Data

US 2014/0237979 A1       Aug. 28, 2014

(51) Int. Cl.
- *A01D 43/00* (2006.01)
- *A01D 57/20* (2006.01)
- *A01D 61/00* (2006.01)

(52) U.S. Cl.
CPC .............. *A01D 57/20* (2013.01); *A01D 61/008* (2013.01)

(58) Field of Classification Search
CPC ....... A01D 43/06; A01D 41/14; A01D 57/20; A01D 34/13; A01D 34/14
USPC ............................ 56/181, 257, 14.5, 153, 158
See application file for complete search history.

(56) References Cited

U.S. PATENT DOCUMENTS

| | | | |
|---|---|---|---|
| 1,758,557 A | | 5/1930 | Bullock |
| 2,427,876 A | * | 9/1947 | Pool et al. ..................... 198/511 |
| 2,455,905 A | * | 12/1948 | Ronning et al. ................. 56/124 |
| 4,238,917 A | * | 12/1980 | Oosterling et al. ............. 56/192 |
| 4,275,547 A | * | 6/1981 | Oosterling et al. ............ 56/13.6 |
| 5,464,371 A | | 11/1995 | Honey |
| RE35,543 E | | 7/1997 | Patterson |
| 6,581,362 B2 | * | 6/2003 | Rosenbalm et al. ................. 56/6 |
| 6,718,744 B2 | * | 4/2004 | Rosenbalm et al. ................. 56/6 |
| 7,356,982 B2 | * | 4/2008 | Barnett ........................... 56/153 |
| 7,454,888 B2 | * | 11/2008 | Barnett ........................... 56/14.7 |
| 7,587,885 B2 | * | 9/2009 | Tippery et al. ................. 56/14.5 |
| 7,726,108 B1 | * | 6/2010 | Pruitt et al. .................... 56/14.5 |
| 8,015,784 B2 | * | 9/2011 | Barnett et al. .................. 56/157 |
| 8,240,114 B2 | * | 8/2012 | Barnett ............................... 56/6 |

(Continued)

FOREIGN PATENT DOCUMENTS

EP        2524590 A1     11/2012

OTHER PUBLICATIONS

European Search Report dated Jul. 29, 2014 (6 pages).

*Primary Examiner* — Árpád Fábián-Kovács

(57) ABSTRACT

A draper platform (100) for mounting on a feederhouse of an agricultural combine comprises an elongate reciprocating knife assembly (140) at a forward edge of the draper platform (100). A left side endless belt conveyor (116) is disposed behind the reciprocating knife assembly on the left side of the draper platform (100) and a right side endless belt conveyor (120) is disposed behind the elongate reciprocating knife assembly (140) on the right side of the draper platform (100). A center endless belt conveyor (118) carries the cut crop material rearward towards a central rear aperture (138) in the frame (101). A conveyor drum (136) is mounted above and in front of the central rear aperture (138). Conveyor members (150, 152, 164, 165) are located at crop transition zones (154, 156) between the left side endless belt conveyor (116), and the conveyor drum (136), and between the right side endless belt conveyor (120) and the conveyor drum (136).

10 Claims, 3 Drawing Sheets

(56) References Cited

U.S. PATENT DOCUMENTS

| | | | |
|---|---|---|---|
| 8,341,927 B2* | 1/2013 | Barnett | 56/157 |
| 8,800,254 B2* | 8/2014 | Stephenson et al. | 56/192 |
| 2005/0126142 A1* | 6/2005 | Rosenbalm et al. | 56/6 |
| 2008/0016837 A1* | 1/2008 | Rosenbalm et al. | 56/192 |
| 2008/0295474 A1 | 12/2008 | Tippery | |
| 2009/0320431 A1* | 12/2009 | Puryk et al. | 56/181 |
| 2010/0269475 A1* | 10/2010 | Barnett et al. | 56/157 |
| 2011/0005184 A1* | 1/2011 | Conrad et al. | 56/181 |
| 2011/0277437 A1* | 11/2011 | Barnett et al. | 56/157 |
| 2012/0047866 A1* | 3/2012 | Fuechtling | 56/153 |
| 2012/0317953 A1 | 12/2012 | Allochis | |

* cited by examiner

DRAPER BELT PLATFORM WITH ADDITIONAL CONVEYOR IN TRANSITION AREA

FIELD

The present invention relates to agricultural combine harvesting machinery, and more particularly to draper platforms. Even more particularly it refers to an additional feeder for the draper platform in the area in which a transverse crop flow transits into a rearward crop flow.

BACKGROUND

Combines are large self-propelled vehicles used for harvesting and threshing agricultural crop in the field. A harvesting head is typically disposed across the front of the combine vehicle supported on a feederhouse. This harvesting head is configured to cut and convey the crop into the combine vehicle itself where it is threshed, separated, and cleaned.

Traditional harvesting heads included an elongate rigid frame to which harvesting implements are added such as row units, reciprocating knife assemblies, augers, reels, and endless belt conveyors. One such type of harvesting head is called a "draper platform" or "draper".

Draper platforms have an elongate frame on which are mounted left and right side endless belt conveyors mounted immediately behind a reciprocating knife. These endless conveyors convey cut crop material inward to a center portion of the draper platform, depositing them on a center conveyor that moves rearward. The center conveyor carries the material to and through an aperture at the rear of the draper platform frame, where it is deposited in an elevating conveyor called a feederhouse, which carries the cut crop material into the combine vehicle for threshing, separating and cleaning. Above the mentioned aperture at the rear of the draper platform frame, a rotationally driven, upper cylindrical conveyor drum with frusto-conical end sections and protruding fingers is usually provided for assisting the crop flow by undershot feeding.

The crop coming from the left and right endless belt conveyors thus needs to change its direction in the center of the platform from a lateral direction into a rearward direction. Under unfavorable circumstances, this area can be due to lack of moving feed elements between the rear end of the center conveyor and the upper conveyor drum subject to crop stalling, which allows crop to leak from the platform, causing crop losses and/or material to lodge in the left and right endless belts with the result of belt stalling. Both issues result in lost time and lost profits for the customer.

This problem is addressed by the arrangement described in the independent claim. Further advantages are provided by the dependent claims.

SUMMARY

A draper platform for mounting on a feederhouse of an agricultural combine comprises an elongate frame extending generally perpendicularly to a direction of operational travel of the header and generally parallel to the ground. An elongate reciprocating knife assembly extends laterally across substantially an entire transverse extent of the draper platform and is disposed at a forward edge of the draper platform. A first side conveyor is disposed behind the reciprocating knife assembly on the left side of the draper platform to convey cut crop material severed by the reciprocating knife assembly at the left side of the draper platform laterally inwardly toward the middle of the draper platform. A second side conveyor is disposed behind the reciprocating knife assembly on the right side of the draper platform to convey cut crop material severed by the reciprocating knife assembly at the right side of the draper platform laterally inwardly toward the middle of the draper platform. A center endless belt conveyor is disposed to receive cut crop material from the first side conveyor and the second side conveyor and to carry the cut crop material rearward towards a rear aperture in the frame through which crop can be fed into the feederhouse. A conveyor drum with a rotational axis extending generally perpendicularly to the direction of operational travel of the header is mounted above and in front of the rear aperture. A first conveyor member is located at a crop transition zone between the first side conveyor and the conveyor drum and a second conveyor member is located at a crop transition zone between the second side conveyor and the conveyor drum.

In accordance with one aspect, a draper platform for mounting on a feederhouse of an agricultural combine is provided, the platform comprising: a frame that is elongate extending generally perpendicularly to a direction of operational travel of the draper platform and generally parallel to the ground; an elongate reciprocating knife assembly that extends laterally across substantially an entire transverse extent of the draper platform, wherein said elongate reciprocating knife assembly is disposed at a forward edge of the draper platform; a left side endless belt conveyor disposed behind the reciprocating knife assembly on the left side of the draper platform to convey cut crop material severed by the elongate reciprocating knife assembly at the left side of the draper platform laterally inwardly toward the middle of the draper platform; a right side endless belt conveyor disposed behind the elongate reciprocating knife assembly on the right side of the draper platform to convey cut crop material severed by the elongate reciprocating knife assembly at the right side of the draper platform laterally inwardly toward the middle of the draper platform; a center endless belt conveyor disposed to receive cut crop material from the left side endless belt conveyor and the right side endless belt conveyor and to carry the cut crop material rearward towards a central rear aperture in the frame through which crop can be fed into the feederhouse; a conveyor drum with a rotational axis extending generally perpendicularly to the direction of operational travel of the draper platform, the conveyor drum mounted above and in front of the central rear aperture; and a left side conveyor member located at a crop transition zone between the left side endless belt conveyor and the conveyor drum and a right side conveyor member located at a crop transition zone between the right side endless belt conveyor and the conveyor drum.

The left side conveyor member and the right side conveyor member may be driven or may be an idler.

The left side conveyor member and the right side conveyor member may be rotatably supported around a rotational axis that is substantially vertical.

The left side conveyor member and the right side conveyor member may be disk-shaped and may have fingers that are distributed around their circumference.

The fingers of the left side conveyor member and the right side conveyor member may be curved rearwards against their normal rotation direction.

The rotational axis of the left side conveyor member and the right side conveyor member may be located below the left side endless belt conveyor and the right side endless belt conveyor, respectively.

Substantially only the fingers of the left side conveyor member and the right side conveyor member may extend beyond the left side endless belt conveyor and the right side endless belt conveyor, respectively.

The rotational axis of the left side conveyor member and the rotational axis of the right side conveyor member may be, with respect to the forward direction of the draper platform, substantially collinear with a rear end of the center endless belt conveyor.

The left side conveyor member and the right side conveyor member may include rollers with protruding ribs.

The left side conveyor member and the right side conveyor member may extend from a floor of the draper platform adjacent an inner end of the left side endless belt conveyor and the right side endless belt conveyor, respectively, and behind a rear end of the center endless belt conveyor.

The left side conveyor member and the right side conveyor member extend vertically at least above the rotational axis of the conveyor drum.

DETAILED DESCRIPTION

Figure 1:
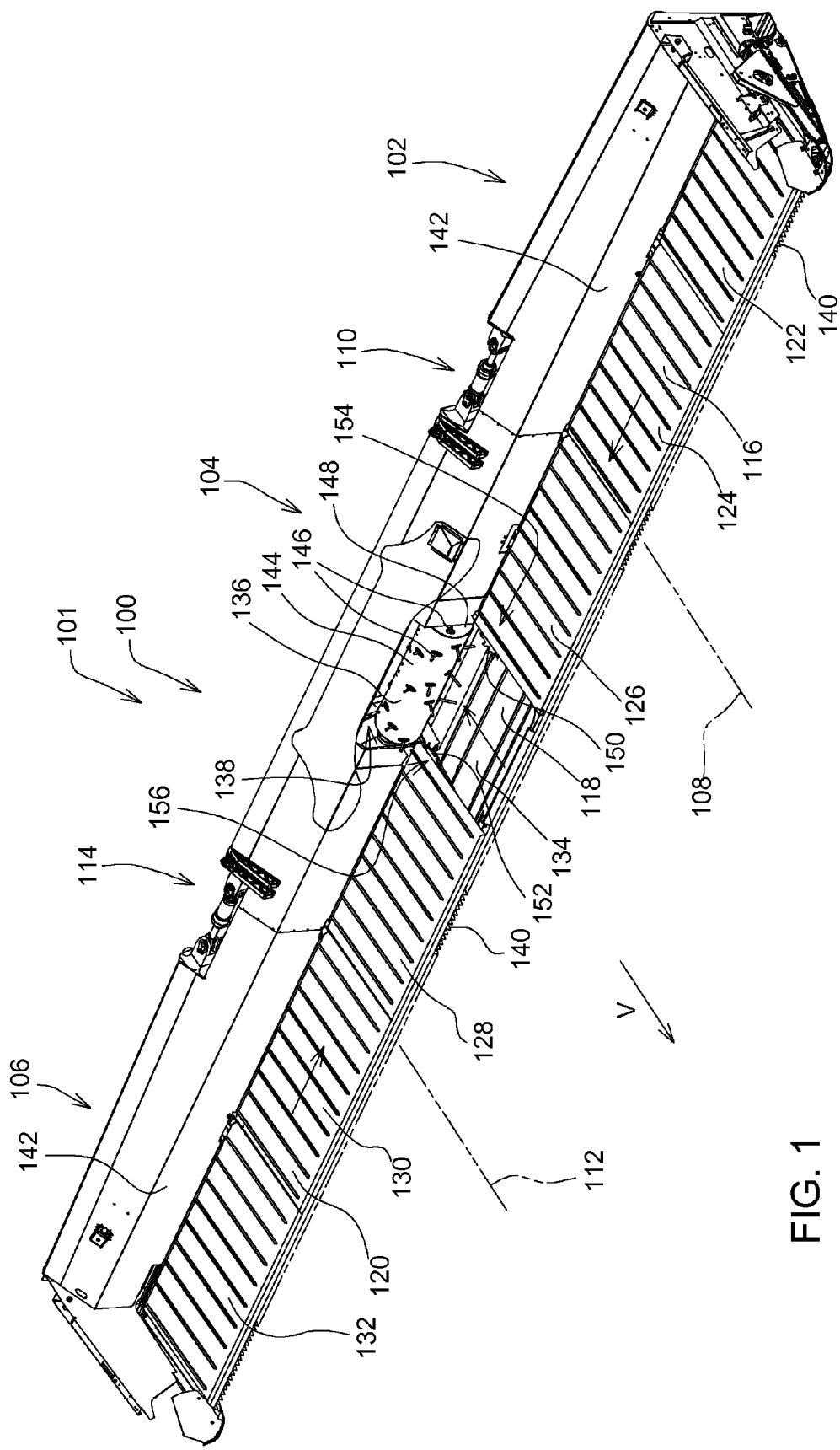
FIG. 1 is a perspective view of a draper platform in accordance with a first embodiment of the present invention.

The terms "front", "in front of", "forward", "fore-and-aft", "rear", "behind", "rearward", and the like as used herein are made in reference to "V" (FIG. 1), which is the direction of travel through the field during normal, straight-line, harvesting operations. The direction of travel is horizontal and perpendicular to the longitudinal extent of the draper platform 100. The terms "transverse" "side-to-side", and the like refer to a direction generally parallel to the longitudinal extent of the draper platform 100. This direction is horizontal and transverse to the direction of travel "V" of the header.

The draper platform 100 is comprised of an elongate and laterally extending frame 101 comprising a left frame section 102, a center frame section 104, and a right frame section 106. These three frame sections are coupled to one another and extend linearly, laterally and horizontally in an end-to-end relationship. Left frame section 102 pivots about a generally horizontal and forwardly extending axis 108 with respect to center frame section 104. This axis is defined by pivot joint 110. Pivot joint 110 couples the left frame section 102 and center frame section 104 together and constrains them to pivot about axis 108. Right frame section 106 pivots about a generally horizontal and forwardly extending axis 112 with respect to center frame section 104. This axis is defined by pivot joint 114. Pivot joint 114 couples the right frame section 106 and center frame section 104 together and constrains them to pivot with respect to each other about axis 112.

Draper platform 100 further comprises a left side endless belt conveyor 116, a center endless belt conveyor 118, and a right side endless belt conveyor 120. Left side endless belt conveyor 116 is comprised of three separate endless conveyor belt 122, endless conveyor belt 124, and endless conveyor belt 126. Right side endless belt conveyor 120 is comprised of endless conveyor belt 128, endless conveyor belt 130, endless conveyor belt 132. Endless conveyor belt 122, endless conveyor belt 124, endless conveyor belt 126, endless conveyor belt 128, endless conveyor belt 130, and endless conveyor belt 132 have upper surfaces that are coplanar and are driven by motors (not shown) to carry cut crop material laterally inwardly in the direction (indicated by the arrows that are superimposed on the conveyors) toward the center portion of draper platform 100, where they deposit their cut crop material onto endless conveyor belt 134 of center endless belt conveyor 118. Endless conveyor belt 134 is driven by a motor (not shown) to carry cut crop material rearwardly in the direction indicated by the arrow superimposed on endless conveyor belt 134. Endless conveyor belt 134 carries the cut crop material rearward and underneath a conveyor drum 136. Conveyor drum 136, in turn, carries the cut crop material rearward on the upwardly facing top surface of the endless conveyor belt 134, through central rear aperture 138 disposed at the rear wall of draper platform 100. Cut crop material passing through central rear aperture 138 is received in a feederhouse (not shown) of an agricultural harvesting machine, in particular a combine (also not shown) in the conventional manner.

An elongate reciprocating knife assembly 140 is disposed along the leading edge of the draper platform 100, extending substantially the entire width of the draper platform. The elongate reciprocating knife assembly 140 is configured to sever crop plants near their roots, permitting the upper portion of the crop plant to fall on the left side endless belt conveyor 116, center endless belt conveyor 118 and right side endless belt conveyor 120. A reel (not shown) is disposed above the elongate reciprocating knife assembly 140 and is configured to engage the tops of the crop plants, gently pushing them rearward such that they fall onto the left side endless belt conveyor 116, the center endless belt conveyor 118, and the right side endless belt conveyor 120.

Back sheets 142 extend generally vertically from the rear edge of endless conveyor belt 122, endless conveyor belt 124, endless conveyor belt 126, endless conveyor belt 128, endless conveyor belt 130, and endless conveyor belt 132. These back sheets serve as a backstop or barrier to prevent cut crop material from passing completely across draper platform 100 and falling on the ground. Back sheets 142 terminate at the central rear aperture 138 and define the opposing sides of central rear aperture 138.

The conveyor drum 136 comprises a central, cylindrical section 144. The central, cylindrical section 144 has a transversely extending axis. A number of fingers 146 are distributed around the length and circumference of the central, cylindrical section 144. At both lateral ends of the central, cylindrical section 144, the conveyor drum 136 has frusto-conical sections 148.

Additional conveyor members comprising a left side conveyor member 150 and a right side conveyor member 152 are provided. The left side conveyor member 150 is disposed in a crop transition zone 154 between the inner, downstream end of the left side endless belt conveyor 116 and the conveyor drum 136. The right side conveyor member 152 is disposed in a crop transition zone 156 between the inner, downstream end of the right side endless belt conveyor 120 and the conveyor drum 136. In the crop transition zone 154 and the crop transition zone 156 the crop flow needs to change its direction from laterally inwards to rearwards and the left side conveyor member 150 and the right side conveyor member 152 facilitate and assist this transition, reducing the risk of crop stalling in the crop transition zone 154 and the crop transition zone 156. The right side conveyor member 152 is a mirror image of the left side conveyor member 150 and rotates in the opposite direction due to the opposite feeding directions of crop.

Figure 2:
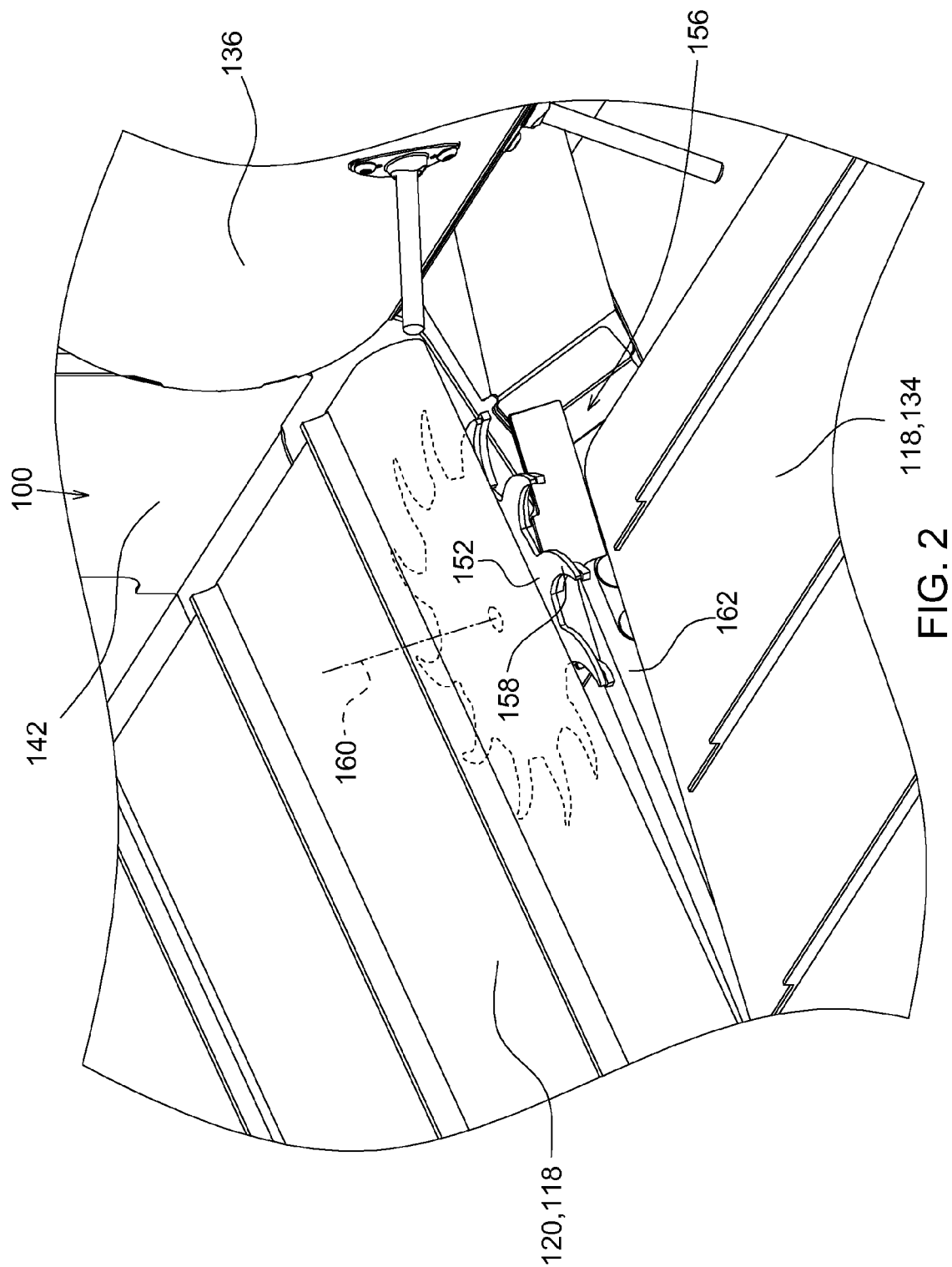
FIG. 2 is a perspective view of the crop transition zone between the right side endless belt conveyor and the conveyor drum of the draper platform of FIG. 1, also showing the right side conveyor member disposed in the crop transition zone.

FIG. 2 shows the right side conveyor member 152 in more detail. In this embodiment, the right side conveyor member 152 is a disk with fingers 158 distributed around its circumference that protrude therefrom. During normal harvesting operation, the right side conveyor member 152 rotates in the counter-clock sense in FIG. 2 around a rotational axis 160 that is substantially vertical in order to feed the crop rearwards to the conveyor drum 136. The right side conveyor member 152 can be actively driven in rotation (e.g. by a motor) or may be an idler and turn as it is pulled by the crop passing over it, (i.e. not driven in rotation by a motor).

The left side conveyor member 150 and the right side conveyor member 152 are constructed and operate as mirror images of each other. Thus, whatever is said or shown herein of the left side conveyor member 150 is true of the right side conveyor member 152 (and vice versa).

The front sides of the fingers 158, with respect to the normal rotation direction, are curved against the rotation direction in the plane of the left side conveyor member 150, and the right side conveyor member 152. This results in a repellent conveying behavior, reducing the risk of crop jams. The rotational axis 160 is below the right side endless belt conveyor 120 and thus essentially only the fingers 158 protrude from below the right side endless belt conveyor 120 into the crop transition zone 156. With respect to the forward direction, the rotational axis 160 is located approximately in line with the rear edge of the center endless belt conveyor 118. The right side conveyor member 152 can be supported on an arm 162 supporting the center endless belt conveyor 118 and the elongate reciprocating knife assembly 140, as described in more detail in US 2012/0291412 A1, the contents of which are incorporated herein by reference for all that they teach.

Figure 3:
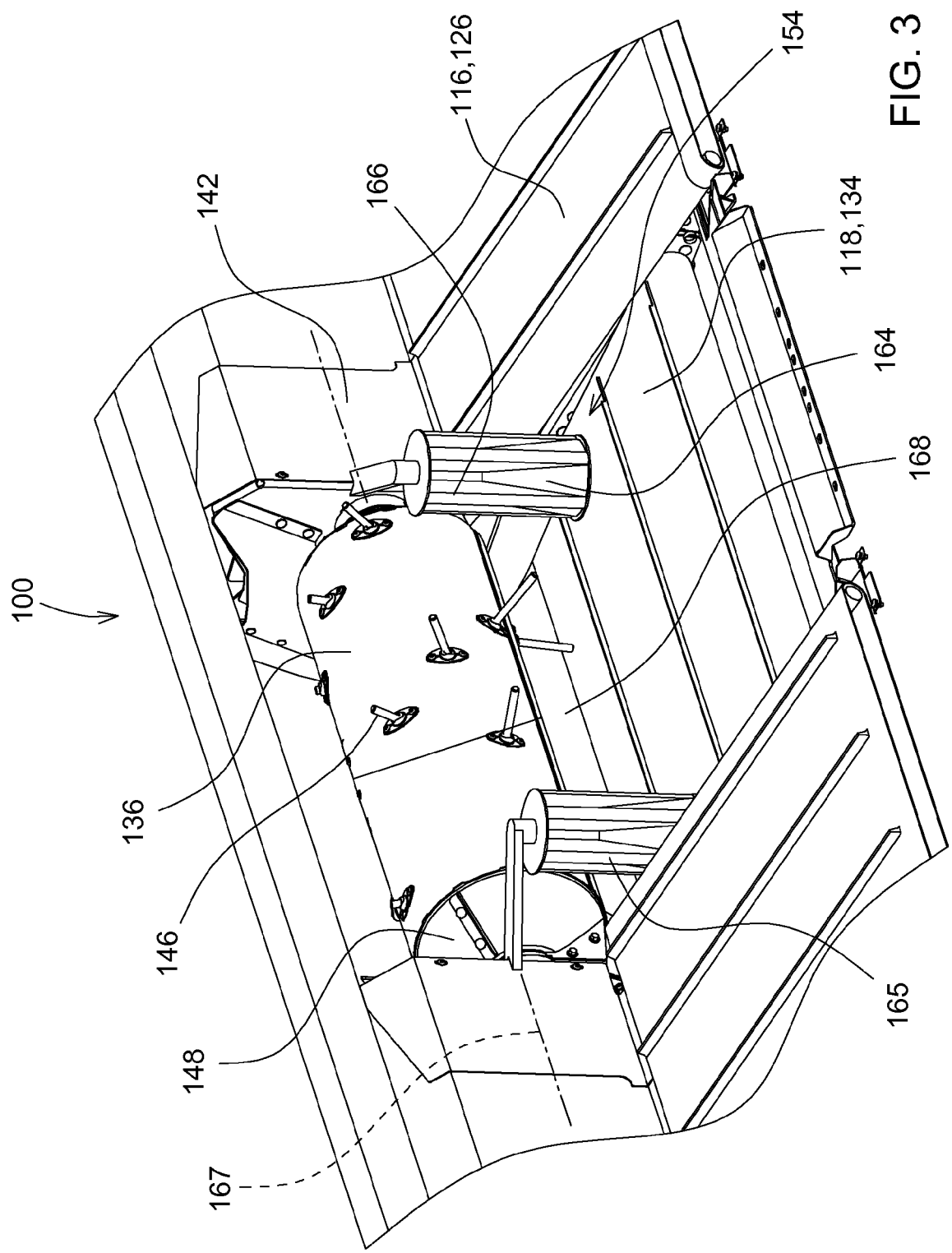
FIG. 3 is a perspective view of the crop transition zone between the right side endless belt conveyor and the conveyor drum of a second embodiment of a draper platform also showing the left side conveyor member disposed in the crop transition zone.

In FIG. 3, the center area of a draper platform 100 according to a second embodiment of the present invention is shown. Elements corresponding to the first embodiment of FIGS. 1 and 2 have been assigned the same reference numerals. Different from the first embodiment, the left side conveyor member 164 and the right side conveyor member 165 are not disks but are in the form of rollers with ribs 166 that extend outward from and protrude from the surface of the rollers.

The left side conveyor member 164 and the right side conveyor member 165 are rotatably supported around their essentially vertical axes and can be actively driven, or permitted to rotate freely, driven only by the crop flow. The rotation direction of the left side conveyor member 164 during normal harvesting operation clockwise as viewed from above. The rotation direction of the right side conveyor member 165 during normal harvesting operation is counterclockwise as viewed from above.

The left side conveyor member 164 and the right side conveyor member 165 are located above a floor 168 of the draper platform 100 and are directly behind the rear edge of the center endless belt conveyor 118 and in front of the conveyor drum 136.

The left side conveyor member 164 is located directly adjacent to the inner (right) edge of the left side endless belt conveyor 116. The right side conveyor member 165 is located directly adjacent the inner (left) edge of the right side endless belt conveyor 120.

The left side conveyor member 164 extends in a vertical direction above the rotational axis 167 of the conveyor drum 136 and even above the upper edge thereof. The right side conveyor member 165 extends in a vertical direction above the rotational axis of the conveyor drum 136 and even above the upper edge thereof.

Having described the preferred embodiments, it will become apparent that various modifications can be made without departing from the scope of the invention as defined in the accompanying claims. For example, the left side conveyor member 150, the left side conveyor member 164, and the right side conveyor member 152 and the right side conveyor member 165 do not necessarily need to rotate about a single axis, but could comprise conveyor belts. Further, the rotational axis (or translational movement direction in of a conveyor belt) could be horizontal with a rearward feeding direction.

In the patent claims herein, the words "a", "an", "one", "1", "two", "2", etc. may be used to indicate a quantity of a particular item or element. The claims were written with the intention that these words should express a minimum quantity. In other words that "three", for example, means "at least three". If the claims herein are intended to cover an absolute number of elements, they will be preceded by the word "only", "just", or "exactly". The use of the term "at least" in the claims herein, is redundant.

What is claimed is:

1. A draper platform (100) for mounting on a feederhouse of an agricultural combine, comprising:
   a frame (101) that is elongate extending generally perpendicularly to a direction of operational travel of the draper platform (100) and generally parallel to the ground;
   an elongate reciprocating knife assembly (140) that extends laterally across substantially an entire transverse extent of the draper platform (100), wherein said elongate reciprocating knife assembly (140) is disposed at a forward edge of the draper platform (100),
   a left side endless belt conveyor (116) disposed behind the reciprocating knife assembly on the left side of the draper platform (100) to convey cut crop material severed by the elongate reciprocating knife assembly (140) at the left side of the draper platform (100) laterally inwardly toward the middle of the draper platform (100);
   a right side endless belt conveyor (120) disposed behind the elongate reciprocating knife assembly (140) on the right side of the draper platform (100) to convey cut crop material severed by the elongate reciprocating knife assembly (140) at the right side of the draper platform (100) laterally inwardly toward the middle of the draper platform (100),
   a center endless belt conveyor (118) disposed to receive cut crop material from the left side endless belt conveyor (116) and the right side endless belt conveyor (120) and to carry the cut crop material rearward towards a central rear aperture (138) in the frame (101) through which crop can be fed into the feederhouse;
   a conveyor drum (136) with a rotational axis (167) extending generally perpendicularly to the direction of operational travel of the draper platform (100), the conveyor drum (136) mounted above and in front of the central rear aperture (138); and
   a left side conveyor member (150, 164) located at a crop transition zone (154) between the left side endless belt conveyor (116) and the conveyor drum (136) and a right side conveyor member (152) located at a crop transition zone (156) between the right side endless belt conveyor (120) and the conveyor drum (136) wherein the left side conveyor member (150, 164) and the right side conveyor member (152, 165) are rotatably supported around a rotational axis (160) that is substantially vertical.

2. The draper platform (100) according to claim 1, wherein the left side conveyor member (150, 164) and the right side conveyor member (152, 165) are one of rotationally driven and rotating idle.

3. The draper platform (100) according to claim 1, wherein the left side conveyor member (150) and the right side conveyor member (152) are disk-shaped and have fingers (158) that are distributed around their circumference.

4. The draper platform (100) according to claim 3, wherein the fingers (158) of the left side conveyor member (150) and the right side conveyor member (152) are curved rearwards against their normal rotation direction.

5. The draper platform (100) according to claim 3, wherein the left side conveyor member (150) and the right side conveyor member (152) are located below the left side endless belt conveyor (116) and the right side endless belt conveyor (120), respectively.

6. The draper platform (100) according to claim 5, wherein substantially only the fingers (158) of the left side conveyor member (150) and the right side conveyor member (152) extend from underneath the left side endless belt conveyor (116) and the right side endless belt conveyor (120), respectively.

7. The draper platform (100) according to claim 5, wherein the rotational axis (160) of the left side conveyor member (150) and the rotational axis (160) of the right side conveyor member (152) is, with respect to the forward direction (V) of the draper platform (100), substantially collinear with a rear end of the center endless belt conveyor (118).

8. The draper platform (100) according to claim 1, wherein the left side conveyor member (164) and the right side conveyor member (165) are rollers with protruding ribs (166).

9. The draper platform (100) according to claim 8, wherein the left side conveyor member (164) and the right side conveyor member (165) extend from a floor (168) of the draper platform (100) adjacent an inner end of the left side endless belt conveyor (116) and the right side endless belt conveyor (120), respectively, and behind a rear end of the center endless belt conveyor (118).

10. The draper platform (100) according to claim 8, wherein the left side conveyor member (164) and the right side conveyor member (165) extend vertically at least above the rotational axis (167) of the conveyor drum (136).

\* \* \* \* \*